(12) United States Patent
Milomo

(10) Patent No.: US 7,892,329 B2
(45) Date of Patent: Feb. 22, 2011

(54) AIR DRYER CARTRIDGE

(75) Inventor: Ignitius Milomo, Bradford (GB)

(73) Assignee: Wabco Automotive UK Limited (GB)

( * ) Notice: Subject to any disclaimer, the term of this patent is extended or adjusted under 35 U.S.C. 154(b) by 306 days.

(21) Appl. No.: 11/912,983

(22) PCT Filed: May 16, 2006

(86) PCT No.: PCT/GB2006/001810
§ 371 (c)(1), (2), (4) Date: Jun. 23, 2008

(87) PCT Pub. No.: WO2006/123138
PCT Pub. Date: Nov. 23, 2006

(65) Prior Publication Data
US 2008/0289505 A1    Nov. 27, 2008

(30) Foreign Application Priority Data
May 16, 2005    (GB) ................................. 0509946.0

(51) Int. Cl.
*B01D 53/26* (2006.01)
(52) U.S. Cl. .......................... 96/134; 55/428; 55/DIG. 17
(58) Field of Classification Search .................. 96/134, 96/135, 143; 55/428, DIG. 17, DIG. 25; 34/80
See application file for complete search history.

(56) References Cited

U.S. PATENT DOCUMENTS

| 3,464,186 A | * | 9/1969 | Walker et al. ................ 96/115 |
| 4,816,047 A | * | 3/1989 | Neal ............................ 96/137 |
| 5,286,283 A |   | 2/1994 | Goodell |
| 5,334,230 A |   | 8/1994 | Sloka |
| 5,427,609 A | * | 6/1995 | Zoglman et al. .............. 95/98 |
| 5,595,588 A | * | 1/1997 | Blevins ........................ 96/108 |
| 5,607,500 A | * | 3/1997 | Shamine et al. .............. 96/144 |
| 5,622,544 A | * | 4/1997 | Shamine et al. .............. 96/134 |
| 5,779,772 A | * | 7/1998 | Unger et al. .................. 96/137 |
| 5,792,245 A | * | 8/1998 | Unger et al. .................. 96/137 |
| 5,851,269 A | * | 12/1998 | Strope ......................... 96/144 |
| 6,723,154 B2 | * | 4/2004 | Olsson et al. ................. 95/118 |
| 6,730,143 B1 | * | 5/2004 | Nichols et al. ............... 95/118 |
| 7,625,437 B2 | * | 12/2009 | Heer ............................ 96/134 |
| 2004/0163535 A1 |   | 8/2004 | Fornof et al. |

FOREIGN PATENT DOCUMENTS

| EP | 0036569 | 9/1981 |
| WO | 2004103509 | 12/2004 |
| WO | WO 2004/103509 A2 * | 12/2004 |

* cited by examiner

*Primary Examiner*—Frank M Lawrence
(74) *Attorney, Agent, or Firm*—Downs Rachlin Martin PLLC

(57) ABSTRACT

The present invention provides desiccant cartridge (10) for a vehicle air dryer, the cartridge (10) having a casing comprising a base (12) and a cover (14), the cartridge (10) further having a charge inlet (24) arranged to receive air from a compressor and a charge outlet (22) in fluid communication with the charge inlet (24), the casing containing a coalescing apparatus (20) and a desiccant (18) arranged between the charge inlet (24) and the charge outlet (22) such that air entering the casing via the charge inlet (24) passes sequentially through the coalescing apparatus (20) and desiccant (18) before reaching the charge outlet (22), wherein the cartridge (10) is further provided with a purge outlet (26) disposed in the casing between the coalescing apparatus (20) and desiccant (18), and the charge inlet (24), charge outlet (22) and purge outlet (26) are provided in the base (12) of the cartridge (10).

20 Claims, 4 Drawing Sheets

AIR DRYER CARTRIDGE

The present invention relates to an air dryer cartridge for use with an air drying apparatus fitted to a vehicle air system.

The provision of air drying apparatus, hereinafter referred to as an air dryer, in vehicle air systems is well known. The air dryer apparatus is typically positioned intermediate of the air source, for example a compressor, and a reservoir. The air dryer includes a desiccant material, for example a moisture adsorbing material such as silica gel, which removes moisture from the air supplied by the compressor so as to prevent said moisture being deposited downstream in the vehicle air system where it may over time damage components of the air system. So as to address the build up of moisture in the desiccant material the air dryer is periodically purged to atmosphere with dry air from the reservoir. Purging of the desiccant is typically undertaken during periods when the compressor is idle and no significant demands for dry air are being made of the reservoir. The desiccant material is typically provided in a removable canister, hereinafter referred to as a cartridge, which is releasably attached to the air dryer. The cartridge is periodically replaced so as to take into account reduction in the performance of the desiccant material over time.

It is not unknown for the air supplied by the compressor to include a mist of very fine oil droplets. The oil droplets are generated from the lubricating oil present in the compressor by the reciprocating action of the compressor. The oil mist typically passes through the air dryer and subsequently to the vehicle air system. Some oil mist will be deposited in the reservoir. While oil deposited in this manner is much less likely to damage air system components in the same manner as moisture, its deposit may lead over time to such problems as, for example, the constriction of narrow passageways in air system components and the degradation of elastomeric seals. It is an object of the present invention to provide an improved air dryer which seeks to prevent the transmission of oil therethrough and further permits oil to be removed from the air dryer.

According to a first aspect of the present invention there is provided a desiccant cartridge for a vehicle air dryer, the cartridge having a casing comprising a base and a cover, the cartridge further having an inlet arranged to receive air from a compressor and an outlet in fluid communication with the inlet, the casing containing a coalescing means and a desiccant arranged between the inlet and the outlet such that air entering the casing via the inlet passes sequentially through the coalescing means and desiccant before reaching the outlet, wherein the cartridge is further provided with a purge outlet disposed in the casing between the coalescing means and desiccant, and the inlet, outlet and purge outlet are provided in the base of the cartridge.

The purge outlet enables purge flow to exit the casing after passing through the desiccant but without passing through the coalescing means. The purge outlet is preferably provided in a sump of the cartridge, which sump is arranged to receive liquid from the coalescing means. In a preferred embodiment the cartridge outlet is provided in a substantially central position in the base of the cartridge. The inlet is provided radially outwardly of the outlet, and the purge outlet is provided radially outwardly of the inlet.

According to a further aspect of the present invention there is provided a valve block for use in connection with the desiccant cartridge of the first aspect, the valve block comprising a body fittable between the desiccant cartridge and the body of an air dryer, the body having an inlet which, in use, is in fluid communication with the cartridge purge outlet, and an outlet in fluid communication with a purge outlet of the air dryer body, wherein the valve block is provided with a one way valve disposed between the inlet and outlet arranged to permit flow through the block from the inlet to the outlet and not in the reverse direction.

In a preferred embodiment the valve block includes a chamber provided between the inlet and the valve. Preferably also the valve block includes a chamber provided between the valve and the outlet.

An embodiment of the present invention will now be described with reference to the accompanying drawings in which.

Figure 1:
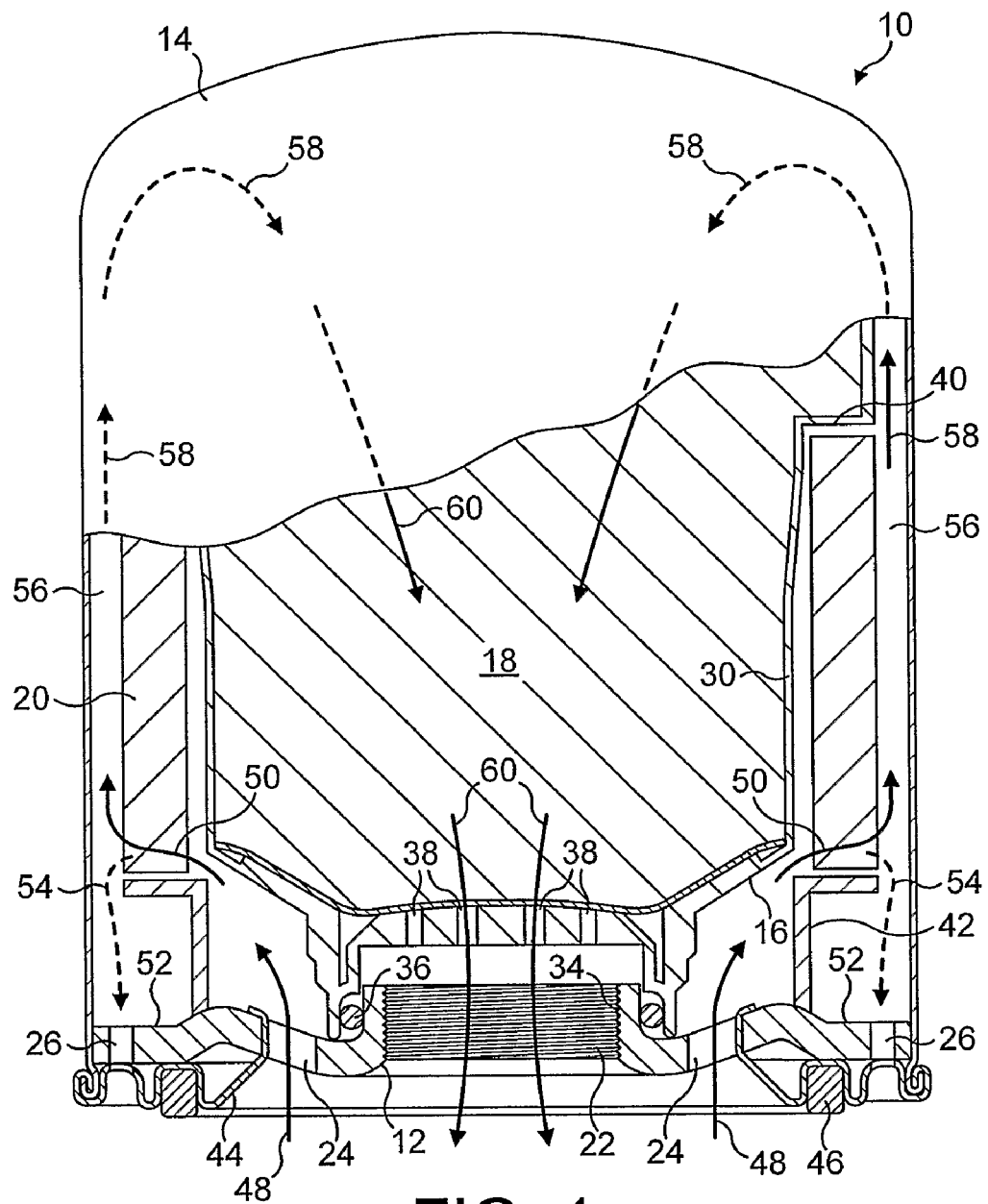
FIGS. 1 and 2 show partial cross-sectional views of an air dryer desiccant cartridge constructed in accordance with the present invention.
Figure 2:
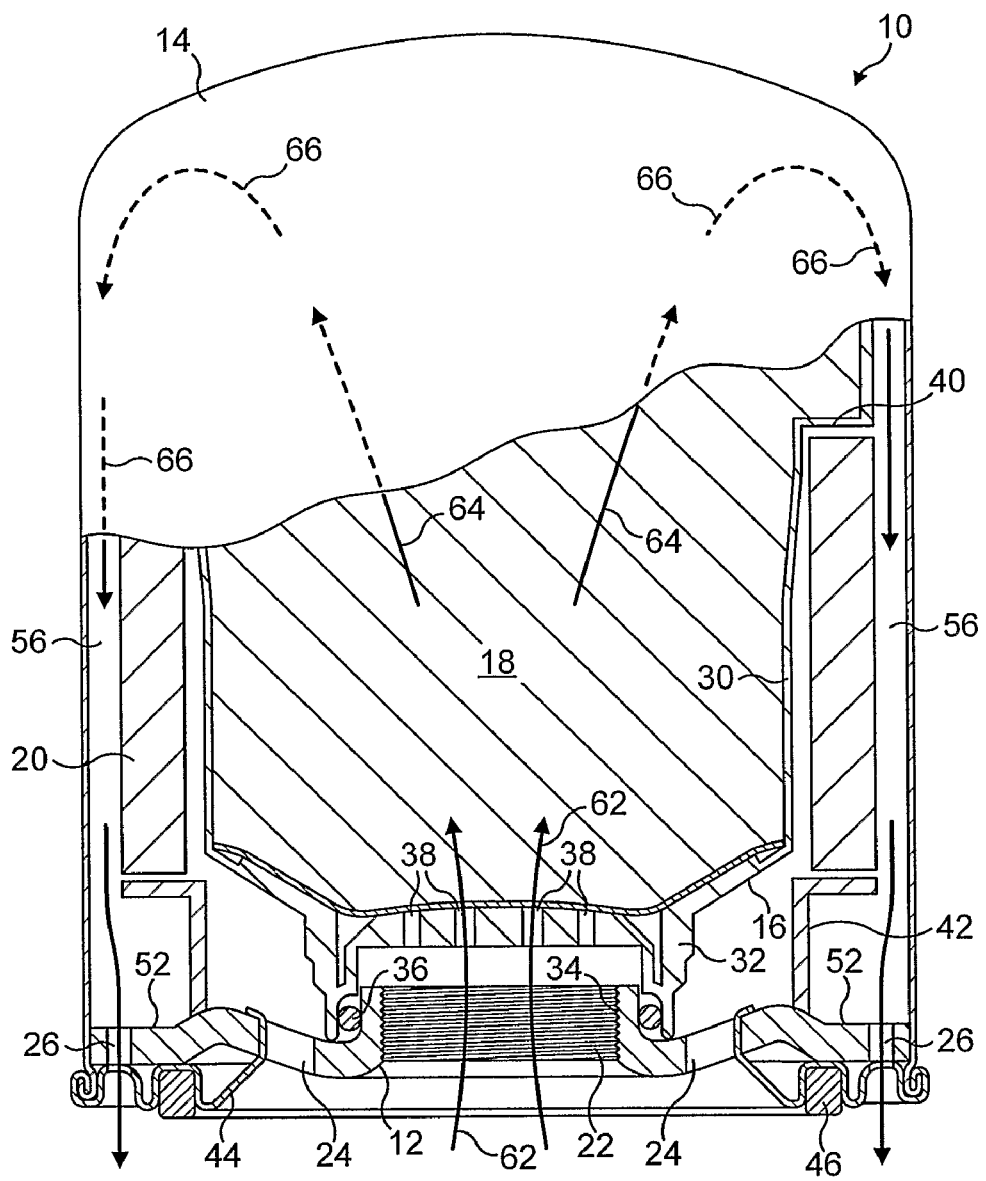
Figure 3:
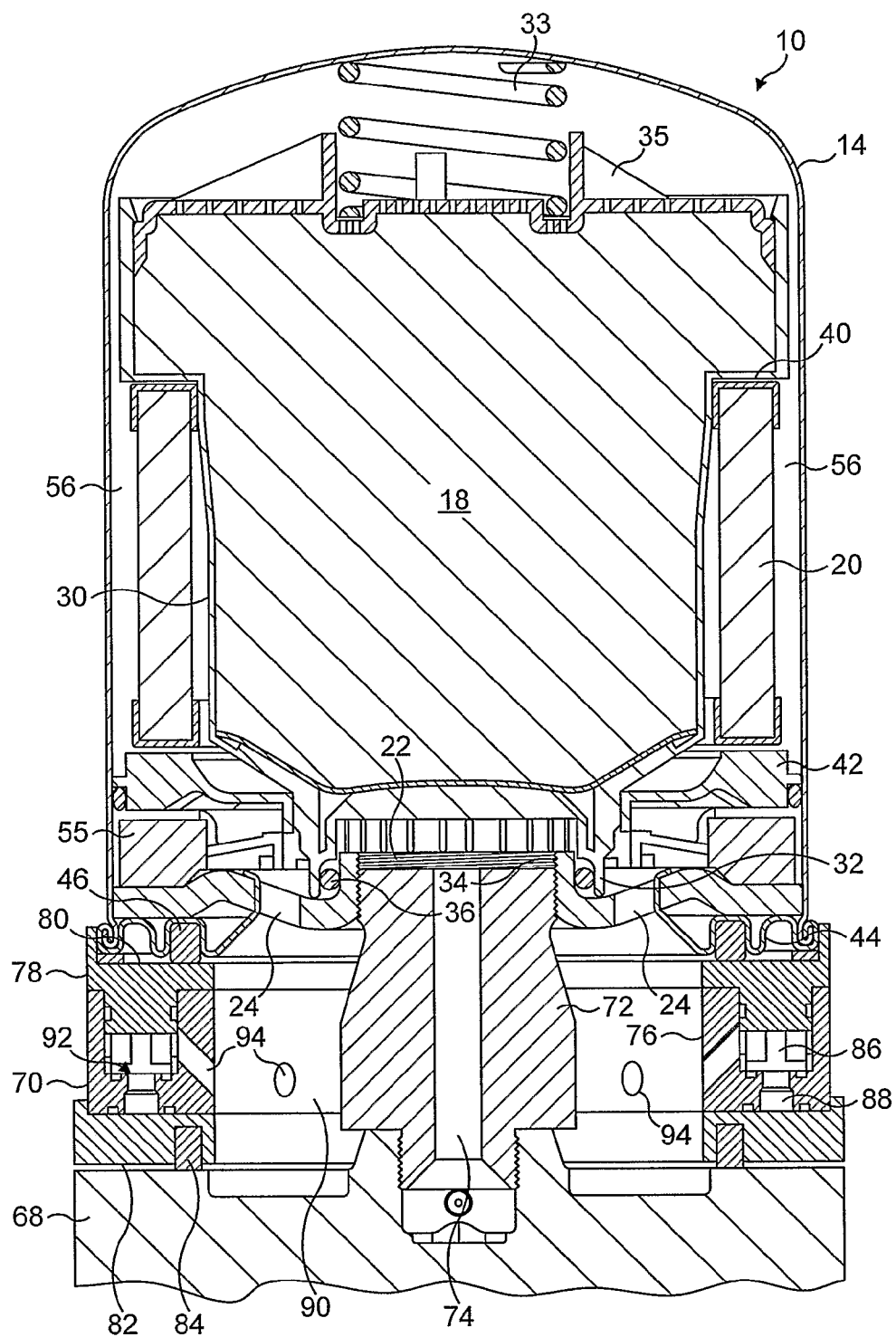
FIG. 3 shows a cross-sectional view of an air dryer desiccant cartridge constructed in accordance with the present invention fitted to an air dryer.

Referring firstly to FIGS. 1 to 3 there is shown an air dryer cartridge generally designated 10. The cartridge comprises a base 12, a cover 14, an internal container 16 containing a desiccant material 18 and coalescing means 20 arranged around a lower portion of the desiccant container 16. The cover 14 is hermetically joined to the base 12 by crimping of the edge of the cover 14 around the base 12. The base 12 is provided with a plurality of apertures comprising a central purge inlet/charge outlet aperture 22, a spaced circumferential array of charge inlet apertures 24 surrounding the central aperture 22, and a further spaced circumferential array of purge outlet apertures 26 which surround both the central inlet/outlet aperture 22 and the array of inlet apertures 24. The term "charge" with reference to the inlets and outlets refers to the flow of air through the cartridge 10 from a compressor to a reservoir of the air system within which the air dryer 10 is provided. The term "purge" with reference to the inlets and outlets refers to the reverse flow of air through the cartridge 10 from a dry air reservoir to atmosphere to regenerate the desiccant material. It will thus be appreciated that the central aperture 22 of the base acts as an outlet for charge flow and an inlet for purge flow.

The central aperture 22 is typically provided with a thread to permit the cartridge 10 to be connected to a projection of an air dryer housing having a complementarily threaded projection. The cartridge base 12 includes a seal carrier 44 having an elastomeric seal 46 which ensures that the cartridge 10 may be fitted to the air dryer body in a leaktight manner.

The container 16 comprises a base 28 having a wall 30 extending upwardly therefrom. The base 28 is provided with a peripheral foot 32 which fits to a lip 34 of the cartridge base 12. As can readily be seen from the figures the lip 34 surrounds central aperture 22 of the base 12. A sealing member such as an O-ring 36 is disposed between the foot 32 and the lip 34 so as to prevent the passage of fluid therebetween. A spring 33 is provided between a perforated lid 35 of the container 16 and the inside of the cover 14 to ensure that the foot 32 is urged towards the lip 34. The container base 28 is provided with a plurality of through holes 38 to allow air to pass between the interior of the container 16 and the aperture 22.

The coalescing means 20 comprises an annular tube of filter material which may be attached to a perforated sleeve. The sleeve in such an embodiment may act as a load bearing member which, in use, transmits the force applied to the coalescing means by the spring and desiccant container 16. The filter material may comprise multiple layers of a porous material and is configured such that it both coalesces liquid droplets, such as oil and water, and traps particulate matter entering the cartridge 10. The coalescing means 20 is located between a shoulder 40 of the desiccant container 16 and a foot 42 which rests on the cartridge base 12. Appropriate sealing means (not shown) are provided at the respective interfaces between the coalescing means 20 and the desiccant container 16 and foot 42 to prevent the passage of fluid therebetween.

Operation of the cartridge 10 will now be described. The cartridge 10 is fitted to the body of an air dryer as will be described in greater detail below. Air from a compressor situated on the vehicle is supplied to the inlet apertures 24 as indicated by arrows 48 on FIG. 1. As described above, this compressed air contains moisture, oil mist and possibly particulate matter which has been drawn through the compressor inlet. The compressed air passes through the coalescing means 20, as indicated by arrows 50 whereupon the oil mist coalesces and passes to a sump 52 in the base of the cartridge 10 as indicated by arrows 54. A portion of the moisture contained in the air flow may also coalesce on or in the coalescing means 20 and pass to the sump 52. A particulate filter 55 may be provided intermediate the inlet apertures 24 and the coalescing means 20 to remove any particulate matter entrained in the air flow.

After passing through the coalescing means 20 the air flow passes though an annular space 56 defined between the cover 14, the container 16 and the coalescing means 20 as indicated by arrows 58, before passing though the desiccant 18. The desiccant 18 removes the remaining moisture from the airflow thereby ensuring that dry air exits the container 16 via the apertures 38 in the base 28 thereof as indicated by arrows 60. the dry air subsequently exits the cartridge 10 via the central aperture 22.

It will be understood that the desiccant 18 needs to be periodically regenerated in order to prevent it becoming saturated with moisture. Regeneration is effected by passing dry air back through desiccant 18 as illustrated in FIG. 2. The dry air enters the cartridge 10 via the central aperture 22 and into the container 16 via the apertures 38 as indicated by arrows 62. The dry air passes through the desiccant 18 removing moisture therefrom before passing through the annular space 56 in the direction of the cartridge base 12 as indicated by arrows 64 and 66. Instead of passing through the coalescing means 20 in the reverse direction and exiting the cartridge 10 through the inlet apertures 24, the now moist air enters the sump 52 and exits the cartridge 10 through the outlet apertures 26. It will be understood that the airflow entrains any liquid present in the sump and conveys this also through the outlet apertures 26.

Figure 4:
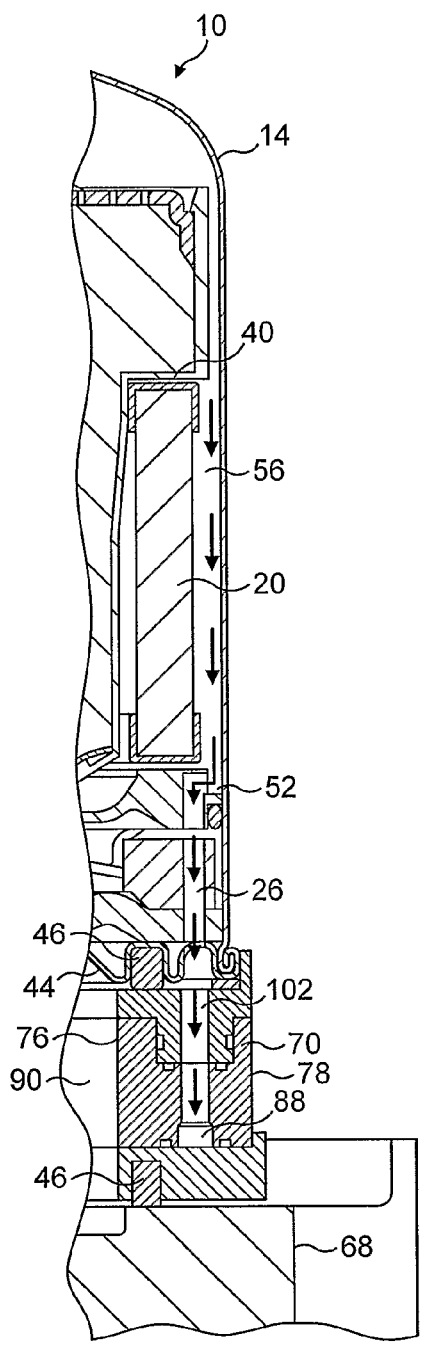
FIG. 4 shows a partial cross-sectional view of the cartridge and air dryer of FIG. 3.
Figure 5:
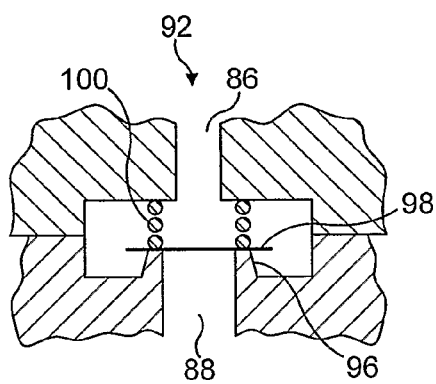
FIG. 5 shows a partial cross-sectional view of a valve of the air dryer.

In order for the cartridge 10 to function in the manner described above an appropriately configured valve block is required. Referring now to FIGS. 3 to 5 there is shown a cartridge 10 fitted to the body 68 of an air dryer. A valve block 70 is interposed between the cartridge 10 and body 68. Features common to the cartridge described with reference to FIGS. 1 and 2 are identified with like reference numerals.

The body 68 is provided with a projection 72 which is received in the central aperture 22 of the cartridge 10. The distal end of the projection 72 is threaded and mates with a complimentary thread provided in the wall of the aperture 22. The projection 72 is provided with a conduit passage 74 which, in use, permits air dried by the desiccant 18 to pass into the air dryer body 68 and further permits regeneration flow to enter the cartridge 10.

The valve block 70 is annular having an inner wall 76, an outer wall 78, an upper face 80 and a lower face 82. An annular cavity 90 is defined between the inner wall 76 and the projection 72. The lower face 82 is provided with an elastomeric seal 84 which seals the lower face 82 to the body 68. The upper face 80 includes a sealing surface against which the seal 46 of the cartridge 10 rests. Within the block 70 there is provided an upper annular chamber 86 and a lower annular chamber 88. Between each chamber 86,88 there are provided a number of spaced valves 92 which will be described in greater detail below. The valves 92 are arranged to allow fluid communication from the lower chamber 88 to the upper chamber 86 and to prevent fluid communication in the opposite direction. A plurality of ports 94 are provided in the inner wall 76 which permit fluid communication between the annular cavity 90 and the upper annular chamber 86. Referring now to FIG. 5, there is shown an example of a valve 92. The valve 92 comprises a seat 96, a movable valve member 98 and a spring 100 arranged to urge the valve member 98 against the seat 96. A conduit 102 (shown schematically in FIG. 4) is provided through the valve block 70. The conduit 102 connects the sump 52 of the cartridge 10 with the lower annular chamber 88.

Air from the compressor is supplied to the annular cavity 90. A small portion thereof enters the ports 94 and the upper annular chamber 86 but is prevented from travelling further by the valves 92. The vast majority of the air entering the annular cavity 90 is thus directed into the cartridge 10 via the inlet ports 24. After passing through the coalescing means 20 a portion of the air from the compressor may enter the sump 52 and enter the lower annular chamber 88. The valves 92 are prevented from opening by virtue of the pressure differential across the valve members 98.

During periods of regeneration flow, air entering the outlet apertures 26 passes though the conduit 102 to the lower annular chamber 88. The air then passes through the valves 92 and into the upper annular chamber 86 then through the ports 94 to the annular cavity. The air is then vented to atmosphere through a vent port (not shown) of the air dryer body 68.

The invention claimed is:

1. A desiccant cartridge for a vehicle air dryer, the cartridge having a casing comprising a base with a bottom surface and a cover, the cartridge further having a charge inlet arranged to receive air from a compressor and a charge outlet in fluid communication with the charge inlet, the casing containing a coalescing means and a desiccant arranged between the charge inlet and the charge outlet such that air entering the casing via the charge inlet passes sequentially through the coalescing means and desiccant before reaching the charge outlet, wherein the cartridge is further provided with a purge outlet in fluid communication at all times to the exterior of the cartridge, and wherein the charge inlet, charge outlet and purge outlet extend through the bottom surface of the base of the cartridge.

2. A desiccant cartridge as claimed in claim 1 wherein the casing includes a sump and the purge outlet is in fluid communication with the sump at all times, which sump is arranged to receive liquid from the coalescing means during charging and to receive liquid from the desiccant when purging.

3. A desiccant cartridge as claimed in claim 2 wherein the sump is annular.

4. A desiccant cartridge as claimed in claim 1 wherein the charge outlet is provided in a substantially central position in the base of the cartridge.

5. A desiccant cartridge as claimed in claim 4 wherein the charge inlet is provided radially outwardly of the charge outlet.

6. A desiccant cartridge as claimed in claim 5 wherein the purge outlet is provided radially outwardly of the charge inlet.

7. A desiccant cartridge as claimed in claim 1 wherein the base includes an annular seal and the purge outlet is provided radially outwardly of the seal.

8. A desiccant cartridge as claimed in claim 1 wherein the cartridge is provided a plurality of charge inlets.

9. A desiccant cartridge as claimed in claim 1 wherein the cartridge is provided with a plurality of purge outlets.

10. A desiccant cartridge for a vehicle air dryer, the cartridge comprising:
    a casing including a base with a bottom surface and a cover, wherein said casing contains a coalescing means and a desiccant;
    a charge inlet arranged to receive air from a compressor and extending through said bottom surface;
    a charge outlet in fluid communication with the charge inlet and disposed radially inwardly from said charge inlet and extending through said bottom surface; and
    a purge outlet disposed radially outwardly from said charge inlet and said charge outlet and extending through said bottom surface, wherein said purge outlet is in fluid communication with said coalescing means during charging of the cartridge and is in fluid communication with said desiccant during purging of the cartridge.

11. A desiccant cartridge according to claim 10, wherein said casing further includes a sump arranged to receive liquid from said coalescing means during charging and to receive liquid from said desiccant when purging.

12. A desiccant cartridge according to claim 10, wherein said charge outlet is provided in a substantially central position in said bottom surface.

13. A desiccant cartridge according to claim 10, wherein the base includes an annular seal and said purge outlet is provided radially outwardly of said annular seal.

14. A desiccant cartridge according to claim 10, further including a first air pathway including said charge inlet, said coalescing means, and said purge outlet when charging, and a second air pathway including said charge outlet, said desiccant, and said purge outlet when purging.

15. A desiccant cartridge according to claim 14, wherein said purge outlet is at all times in fluid communication with the exterior of the cartridge.

16. A desiccant cartridge for a vehicle air dryer, the cartridge comprising:
    a casing including a base with a bottom surface and a cover, wherein said casing contains a coalescing means and a desiccant;
    a charge inlet arranged to receive air from a compressor;
    a charge outlet in fluid communication with the charge inlet;
    a purge outlet disposed radially outwardly from said charge inlet and said charge outlet and extending through said bottom surface;
    a charging air pathway including said charge inlet, said coalescing means, and said purge outlet; and
    a purging air pathway including said charge outlet, said desiccant, and said purge outlet.

17. A desiccant cartridge according to claim 16, wherein said casing further includes a sump arranged to receive liquid from said coalescing means during charging and to receive liquid from said desiccant when purging.

18. A desiccant cartridge according to claim 17, wherein said charge outlet is provided in a substantially central position in said bottom surface and wherein said charge inlet is provided radially outwardly of said charge outlet.

19. A desiccant cartridge according to claim 18, wherein the purge outlet is provided radially outwardly of the charge inlet.

20. A desiccant cartridge according to claim 19, wherein said purge outlet is at all times in fluid communication with the exterior of the cartridge.

* * * * *